June 18, 1940.  L. F. BAASH  2,204,647
ROTARY TABLE BUSHING
Filed Dec. 17, 1938
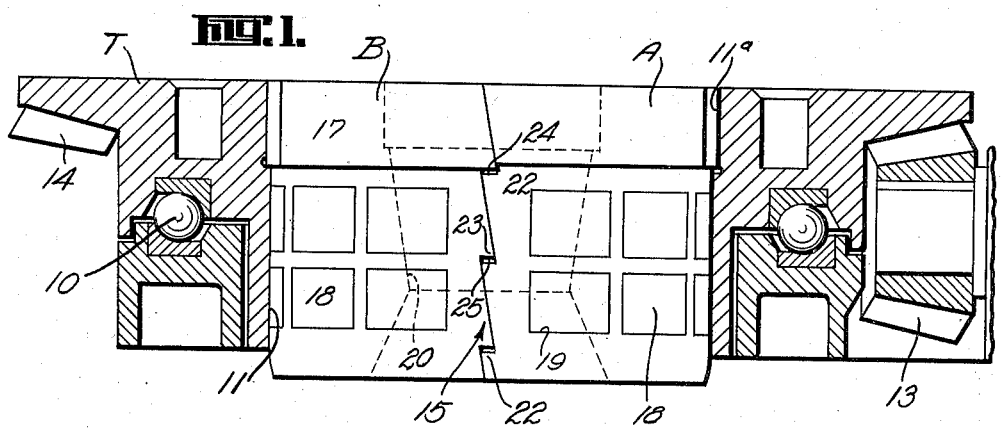
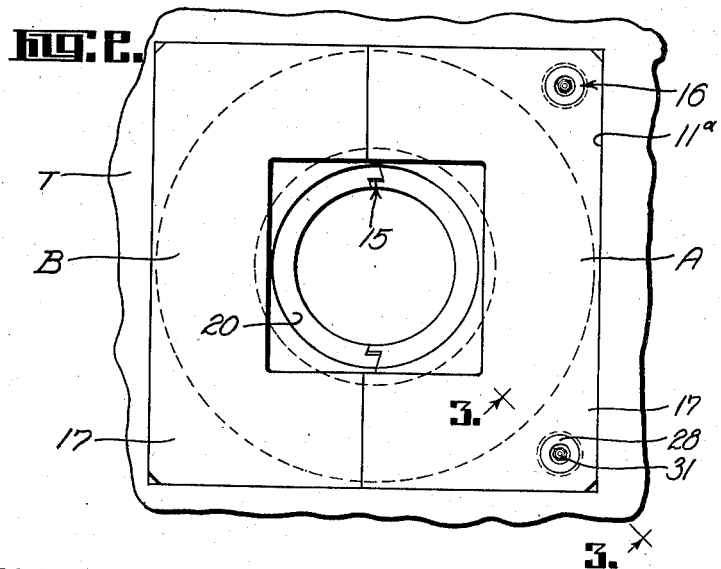
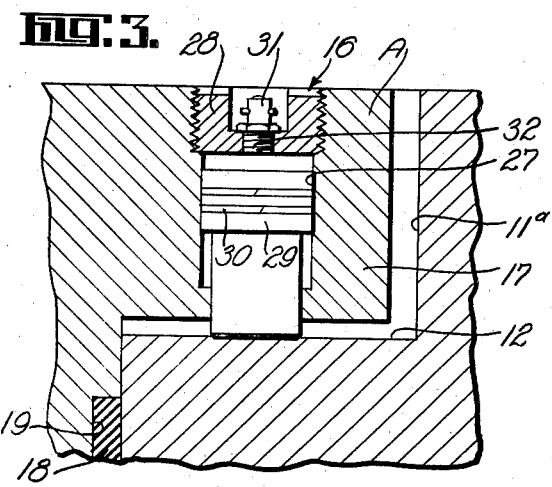
Inventor
LAWRENCE F. BAASH
By
His Attorney Patented June 18, 1940

2,204,647

UNITED STATES PATENT OFFICE 2,204,647

ROTARY TABLE BUSHING

Lawrence F. Baash, Los Angeles, Calif., assignor to Baash-Ross Tool Company, Los Angeles, Calif., a corporation of California Application December 17, 1938, Serial No. 246,426

6 Claims. (Cl. 255—23)

This invention relates to well drilling equipment and relates more particularly to a bushing for use in the rotary table of a well drilling rig. A general object of this invention is to provide a simple practical and inexpensive master bushing that remains tight and firm in the opening of the rotary table.

In the drilling of a well with the rotary method of well drilling a "rotary" is provided in the derrick to rotate the string of drill pipe. A "rotary" usually embodies a horizontally disposed rotary table having a central opening carrying a master bushing. The master bushing in turn carries a drive bushing that transmits rotation to a polygonal drive stem connected with the drilling string. The rotary table and the bushing therein are subjected to severe shocks and heavy torsional forces which often cause the master bushing to work or slap in the rotary table. This working or slapping of the master bushing in the rotary table causes excessive wearing of the engaging surfaces and loosening of the bushing in the table.

Another object of this invention is to provide a master bushing embodying simple yet very effective means for maintaining the bushing tight in the opening of the rotary table so that it cannot slap, play or work.

Another object of this invention is to provide a master bushing embodying integral wedge parts that cooperate to hold the bushing tight in the opening of the rotary table.

Another object of this invention is to provide a master bushing of the character mentioned in which the means for holding the bushing tight in the rotary table is conditioned or actuated by the weight of one of the bushing sections and certain of the forces on the bushing.

Another object of this invention is to provide a master bushing of the character mentioned in which the means for holding the bushing tight in the rotary table serves to prevent relative play, movement and wear between the sections of the bushing.

Another object of this invention is to provide a master bushing that remains firm and tight in the opening of the rotary table so that the slips and drive bushing may correctly seat in the master bushing.

A further object of this invention is to provide a master bushing of the character mentioned embodying simple positive means for freeing or loosening the bushing for ready removal from the rotary table.

The various objects and features of my invention will be fully understood from the following detailed description of a typical preferred form of apparatus and application of the invention, throughout which description reference is made to the accompanying drawing, in which:

Fig. 1 is a side elevation of the improved master bushing of this invention in the operative position in a rotary table showing the rotary table in vertical cross section. Fig. 2 is a top or plan view of the bushing and Fig. 3 is an enlarged fragmentary vertical detailed sectional view taken as indicated by line 3—3 on Fig. 2 illustrating one of the units or means for freeing the bushing for removal from the table.

The present invention may be embodied in forms for use in rotary tables varying somewhat in character. In the following detailed description I will describe a typical preferred embodiment of the invention installed in a more or less conventional rotary table. It is to be understood that the invention is not to be construed as limited or restricted to this specific form or application of the invention.

The rotary table T illustrated in the drawing is a horizontally disposed member supported for rotation about a vertical axis by suitable bearings 10. A central vertical opening 11 extends through the table T to receive the master bushing. The upper portion 11a of the opening 11 is square or polygonal in transverse cross section. In the particular case illustrated the major lower portion of the opening 11 is cylindrical having vertical walls and the polygonal portion 11a of the opening has flat vertical walls. An upwardly facing shoulder 12 occurs on the wall of the opening 11 where its polygonal portion 11a joins its major cylindrical portion. The table T is driven or rotated by a bevelled gear 13 meshing with ring gear teeth 14 on the under side of the table.

The improved master bushing of the present invention may be said to comprise, generally, two bushing sections A and B, wedge means 15 on the sections A and B for holding the same against movement in the table opening 11 and means 16 for freeing or loosening the sections A and B when the bushing is to be removed from the table T.

The bushing sections A and B are similar and complementary and are shaped to occupy the opening 11 in the rotary table T. The sections A and B have what I will term heads 17 for reception in the polygonal portion 11a of the table opening 11. The heads 17 are polygonal having flat vertical external surfaces engageable with the walls of the polygonal opening portion 11ª. The under sides of the heads 17 oppose the shoulder 12 and the head 17 of the section B and may bear on the shoulder 12. The upper sides of the heads 17 may be substantially flush with the top of the table T when the bushing is in place in the table. The major lower portions of the bushing sections A and B are shaped to conform to the major cylindrical part of the table opening 11. The sections A and B are shaped to define a central vertical opening 20. The upper portion of the opening 20 may be square or polygonal in cross section while the major portion of the opening tapers downwardly and inwardly. The opening 20 is provided to receive pipe supporting slips, drive bushings, and like parts as is well known to those skilled in the art.

In accordance with the invention it is preferred to provide shock absorbing means and wear taking means on the bushing sections A and B. These means comprise blocks or inserts 18 of rubber, synthetic rubber composition or other resilient material resistant to oil and the well fluids. The inserts 18 are arranged in spaced recesses 19 in the curved exteriors of the bushing sections A and B and are adapted to cooperate with the wall of the opening 11. The cushioning inserts 18 may be vulcanized or otherwise fixed in the recesses 19. The flexible resilient inserts 18 initially protrude from the recesses 19 and when the sections A and B are tightened in the table opening 11 by the means 15 the inserts are compressed against the wall of the opening 11. The inserts 18 serve to absorb shocks and jars and take the wear. It is preferred to space the rows or series of resilient inserts 18 from the inner opposing sides of the bushing sections A and B.

The means 15 is an important feature of the invention. The means 15 operates to automatically hold the master bushing tight in the opening 11 of the rotary table T and to hold the bushing sections A and B in tight engagement to prevent relative slap and movement between them. It is a feature of the invention that the means 15 is simple and readily embodied in the bushing.

The means 15 includes one or more wedge parts 22 on each inner surface or side of the section A and one or more inclined parts or wedge parts 23 on each inner side of the section B. In the preferred construction there is a plurality or series of wedge parts 22 provided on the inner side of the section A at each side of the bushing opening 20 and complementary sets or series of wedge parts 23 on the inner sides of the section B engageable by the wedge parts 22. The active or inclined faces of the wedge parts 22 and 23 are preferably flat and are of substantial width extending from the periphery of the bushing to the bushing opening 20. The wedge parts 22 on the section A are stepped, that is, the ends of adjacent wedge parts 22 are connected by upwardly facing shoulders 24. The wedge parts 23 on the section B are stepped in a similar manner, there being downwardly facing shoulders 25 between the adjacent wedge parts 23. The shoulders 24 and 25 are in opposition and are preferably spaced apart when the master bushing is in the opening 11 of the rotary table T. It is preferred to make the wedge parts 22 and 23 integral parts of the bushing sections A and B. It is also preferred that the series of wedge parts 22 and 23 extend between the upper and lower ends of the bushing as illustrated in Fig. 1. The active or inclined surfaces of the wedge parts 22 and 23 are machined or finished to have sliding engagement or cooperation.

The walls of the opening 11 in the table T are preferably machined or accurately finished and the bushing sections A and B are finished or machined to accurately fit the opening 11 with only mechanical clearance. The parts are related and proportioned so that the lower face of the head 17 of the bushing section B rests on the shoulder 12 while the lower side of the head 17 of the section A is spaced above the shoulder 12 when the bushing is in its operative position in the rotary table T. Due to this arrangement the weight of the section A and a portion of the weight applied to the master bushing is transmitted to the section B through the cooperating wedge parts 22 and 23 and the active engaging inclined surfaces of the wedge parts serve to urge the sections A and B outwardly into tight engagement with the walls of the opening 11.

The vertical series of engaging wedge parts 22 and 23 dependably hold the two bushing sections A and B against relative slap and play in addition to holding the bushing tight in the table opening 11. The vertical distribution or spacing of the cooperating wedge parts 22 and 23 provides for a desirable distribution of the expanding forces or tightening forces on the two bushing sections A and B. It is to be observed that the means 15 is simple and inexpensive to construct and is automatic in operation, requiring no manipulation, adjustment or care.

The means 16 are provided to free or loosen the master bushing for easy removal from the table T. The means 16 are operable to raise or jack up the section A and thus loosen or free the wedge parts 22 and 23 and provide for the ready withdrawal of the master bushing from the table T. In accordance with the invention the means 16 are in the nature of hydraulic jack means or plunger means and there are preferably two like means 16 provided on the bushing section A.

A vertical cylinder opening 27 is provided in each outer corner portion of the head 17 on the bushing section A. The openings 27 extend between the upper and lower sides of the head 17 of the section A. The lower parts of the openings 27 may be reduced in diameter. Heads or plugs 28 are threaded in the upper ends of the openings 27. Rams or plungers 29 are operable in the cylinder openings 27. The rams 29 may have suitable sealing rings 30 sealing with the walls of the openings 27. The lower portions of the rams 29 are reduced in diameter to pass through the reduced lower parts of the openings 27. The lower ends of the rams 29 are adapted to engage against the shoulder 12 on the wall of the table opening 11.

Means are provided for admitting fluid under pressure to the cylinder openings 27 above the rams 29. In the simple preferred structure illustrated suitable grease gun fittings are threaded in openings 32 in the plugs 28 for the purpose of admitting fluid under pressure to the cylinder openings 27. The fittings 31 are adapted to receive grease or other fluid under pressure from pressure holding or developing means such as a grease gun and are preferably such that they may be manipulated to relieve the pressures in the cylinder openings 27. When fluid under pressure is supplied to the upper portions of the cylinder openings 27 the rams 29 are forced downwardly against the shoulder 12 and the fluid under pressure acting between the rams and the lower sides of the plugs 28 serves to raise the bushing section A.

In the use or operation of the improved bushing provided by this invention the two sections A and B are preferably lowered into the table opening 11 simultaneously. When the sections A and B are lowered into the opening 11 it is preferred to maintain the section A in a slightly higher plane than the section B, for example, the shoulders 24 of the section A may be engaged against the shoulders 25 of the section B. This allows the sections A and B to be freely passed down into the opening 11. When the master bushing is seated in the opening 11 the flexible resilient inserts 18 are engaged and compressed against the wall of the opening 11. The weight of the section A and the weight or a portion of the weight applied to the master bushing acts to move the wedge parts 22 down with respect to the wedge parts 23. The cooperating surfaces of the engaging wedge parts 22 and 23 urge or force the sections A and B laterally into tight engagement with the wall of the opening 11. The engaging wedge parts 22 and 23 also hold the sections A and B against relative play and slap. During the drilling operations the down forces and weight applied to the bushing urge or hold the sections A and B tight in the opening 11 by reason of the engaging wedge parts 22 and 23. Thus the improved bushing of the present invention automatically remains firm in the opening 11 and cannot work, play or move in the table opening. The inserts 18 assist in absorbing shock and movement and take considerable wear.

When it is desired to withdraw the master bushing from the table T fluid under pressure is passed into the cylinder openings 27 by means of grease guns or the like connected or engaged with the fittings 31. The lubricant or fluid under pressure acts against the opposite ends of the rams 29 and the plugs 28. The rams 29 are engaged against the shoulders 12 and the fluid under pressure acting as just described jacks up or raises the section A in the opening 11. This frees or removes the actuating forces from the engaging wedge parts 22 and 23 and thus releases the bushing for ready withdrawal from the table T. The bushing may then be easily raised from the table opening 11. It is preferred to simultaneously withdraw the two bushing sections A and B.

Having described only a typical preferred form and application of my invention I do not wish to be limited or restricted to the specific details herein set forth, but wish to reserve to myself any variations or modifications that may appear to those skilled in the art or fall within the scope of the following claims.

Having described my invention, I claim:

1. A bushing for use in the opening of a rotary table comprising bushing sections for arrangement in the opening, the bushing sections having opposing inner sides, and means for preventing working of the bushing in the opening including vertical series of stepped complementary engaging wedge parts on said sides of the sections operating to urge the sections against the wall of the opening.

2. A bushing for the opening of a rotary table comprising a bushing body designed to occupy the opening, the body being divided into two sections, means for holding one of the sections against downward movement, cooperating wedge parts on the sections operable by downward movement of the other section to tighten the bushing in the opening and prevent working of the bushing in the opening, and means for raising said other section to free the bushing.

3. A bushing for the opening of a rotary table comprising a bushing body designed to occupy the opening, the body being divided into two sections, means for holding one of the sections against downward movement, wedge means operable by downward movement of the other section for holding the bushing tight in the opening, and means for shifting said other section upwardly to release the wedge means.

4. A bushing for the opening of a rotary table comprising a bushing body designed to occupy the opening, the body being divided into two sections, means for holding one of the sections against downward movement, wedge means operable by downward movement of the other section for holding the bushing tight in the opening, and means for shifting said other section upwardly to release the wedge means, the last named means including a jack on the said other section engageable downwardly against the table.

5. A bushing for the opening of a rotary table comprising a bushing body designed to occupy the opening, the body being divided into two sections, means for holding one of the sections against downward movement, wedge means operable by downward movement of the other section for holding the bushing tight in the opening, and means for shifting said other section upwardly to release the wedge means, the last named means including hydraulic jacks on said other section engageable downwardly against the table.

6. A bushing for use in the opening of a rotary table comprising bushing sections for arrangement in the opening, yielding wear taking parts on the sections for bearing on the wall of the opening, and engaging wedge parts on the sections urging the sections against the wall of the opening.

LAWRENCE F. BAASH.